(12) United States Patent
Jakob (10) Patent No.: US 9,200,696 B2
(45) Date of Patent: Dec. 1, 2015

(54) CLIPS FOR ATTACHING STAPLES FOR JOINING CONVEYOR BELT ENDS, STAPLES FOR JOINING CONVEYOR BELT ENDS AND CLIP-STAPLE ASSEMBLIES

(71) Applicant: ASER, Saint-Chamont (FR)

(72) Inventor: Horst Jakob, Deaux (FR)

(73) Assignee: Aser (FR)

( * ) Notice: Subject to any disclaimer, the term of this patent is extended or adjusted under 35 U.S.C. 154(b) by 0 days.

(21) Appl. No.: 14/201,080

(22) Filed: Mar. 7, 2014

(65) Prior Publication Data

US 2014/0182089 A1    Jul. 3, 2014

Related U.S. Application Data

(63) Continuation of application No. 12/595,496, filed as application No. PCT/FR2008/000501 on Apr. 10, 2008, now Pat. No. 8,701,876.

(30) Foreign Application Priority Data

Apr. 10, 2007 (FR) ...................... 07 02650

(51) Int. Cl.
 *B65G 17/00* (2006.01)
 *F16G 3/00* (2006.01)
 *F16G 3/02* (2006.01)
 *F16G 3/04* (2006.01)

(52) U.S. Cl.
 CPC .. *F16G 3/00* (2013.01); *F16G 3/02* (2013.01); *F16G 3/04* (2013.01); *Y10T 24/1608* (2015.01); *Y10T 24/1632* (2015.01)

(58) Field of Classification Search
 USPC ............ 198/844.2; 24/33 R, 33 A, 33 F, 33 P, 24/33 V, 33 L, 33 B, 33 C, 33 K, 33 M, 31 H; 474/253, 255, 257
 See application file for complete search history.

(56) References Cited

U.S. PATENT DOCUMENTS

| 792,135 A | 6/1905 | Jackson |
|---|---|---|
| 1,092,859 A | 4/1914 | Purple |
| 1,479,915 A | 1/1924 | Hulse |
| 1,727,574 A | 9/1929 | Tibbals |
| 1,765,080 A | 6/1930 | Latimer |
| 2,132,295 A | 10/1938 | Hawkins |

(Continued)

FOREIGN PATENT DOCUMENTS

| FR | 897662 A | 3/1945 |
|---|---|---|
| FR | 1 185 742 | 8/1959 |
| WO | WO 03012315 A1 * | 2/2003 |

*Primary Examiner* — William R Harp
(74) *Attorney, Agent, or Firm* — Blank Rome LLP (57) ABSTRACT

A conveyor belt joining staple including upper and lower staple plates situated at different levels joined by knuckles. The upper staple plate has through-holes for passage of staple attaching clip claws and the lower staple plate has bridges that form a recess between a bar of the bridge and an upper surface of the lower plate. The lower staple plate has two shearing lines corresponding to the recess of the bridge, and inlet and outlet toboggans that each have a curved tab. The toboggans are symmetrical with respect to the longitudinal axis of the bridge. Each toboggan has a boss that has an upper round portion and base rounded portions. A portion of the boss is connected to a portion of the tap. Each inlet toboggan-boss is situated in vertical alignment with a corresponding hole of the upper plate for the passage of the clip claws.

3 Claims, 10 Drawing Sheets

(56) References Cited

U.S. PATENT DOCUMENTS

| | | | |
|---|---|---|---|
| 2,224,532 A * | 12/1940 | Ziller | 24/33 B |
| 2,935,773 A | 5/1960 | Schick | |
| 2,983,974 A | 5/1961 | Tebb et al. | |
| 4,220,070 A | 9/1980 | Anstett | |
| 4,607,638 A | 8/1986 | Crainich | |
| 5,095,590 A | 3/1992 | Schick | |
| 5,529,451 A | 6/1996 | Bruins et al. | |
| 5,638,582 A | 6/1997 | Klatt et al. | |
| 6,374,462 B1 * | 4/2002 | Jakob | 24/33 P |
| 8,701,876 B2 * | 4/2014 | Jakob | 198/844.2 |

* cited by examiner

CLIPS FOR ATTACHING STAPLES FOR JOINING CONVEYOR BELT ENDS, STAPLES FOR JOINING CONVEYOR BELT ENDS AND CLIP-STAPLE ASSEMBLIES

CROSS-REFERENCE TO RELATED APPLICATIONS

This is a continuation application of application Ser. No. 12/595,496, filed Apr. 21, 2010, now U.S. Pat. No. 8,701,879; which is a National Phase Application of PCT/FR2008/000501, filed on Apr. 10, 2008, which claims priority to French Application No. FR 0702650, filed on Apr. 10, 2007, the contents of which are hereby incorporated by reference.

FIELD OF THE INVENTION

The present invention relates to clips intended for attaching conveyor belt ends with staples for joining conveyor belt ends. It also relates to improved staples which are particularly suited to gain the best possible benefit from said new clips. Finally, the invention relates to a clip-staple assembly associating both elements prior to the positioning of staples on the conveyor belt ends.

BACKGROUND OF THE INVENTION

Joining staples for conveyor belts, belts and similar products composed of an upper plate and a lower plate, both said plates being connected at one end by one or several narrower portions called knuckles are known, with said staples being able to be mounted in two series each enclosing one end of the conveyor belt between the upper plates and the lower plates of the staples in each series, the same operation being carried out again on the other end of the conveyor belt while shifting the knuckles of the second series of staples with respect to those of the first series, so that the knuckles of the second series are engaged between the knuckles of the first series. A connecting and articulating rod is then engaged into one knuckle of a series of staples and then into one knuckle of the other series of staples and so on, thus making the equivalent of a hinge.

As regards the attaching of staples at conveyor belt ends which they enclose between upper plate/lower plate couples, various means are used, with two means being the most common ones when considering the development of the related technology.

The most common staple attaching means consists of U-shaped clips made of round metal wire. Such clips include a back composed of a rectilinear round wire portion extended at both ends by pointed branches made of the same wire and bent at right angles with respect to the back. The spikes of the round wire branches are obtained by machining, i.e. milling or grinding.

A second known means for attaching staples is composed of claws extending the upper plate of the staple downwards.

The clips made of U-shaped metal wire are inserted into holes provided in the upper plate of the staples. The pointed branches go through the end of the conveyor belt inserted between the upper plate and the lower plate of the staple. The claws extending the upper plate of a staple are directly inserted into the end of the conveyor belt inserted between the two plates.

Initially, the pointed branches of the clips, when inserted through the thickness of the conveyor belt end, would meet corresponding holes provided in the other plate of the staple, then would go through such holes and be bent onto the outside of the lower plate of the staple. Similarly, the claws inserted along a similar path would also be bent onto the outside of the lower plate. This bend was made using an appropriately shaped matrix positioned under the lower plate. However, this relatively rudimentary means had the disadvantage consisting in that the spikes folded to the outside would make the clip liable to stripping during the operation of the conveyor belt.

To overcome these disadvantages, two prior documents, patent FR 2 792 050 of Apr. 12, 1999 and European patent publication No. 0 464 399 (filing No. 91 109 427.4) have proposed solutions.

Patent FR 2 792 050 has proposed, in the case of staples with claws incorporated in the upper plate, producing doors 5 formed by a bar of the material constituting the lower plate, oriented parallel to the edge of the lower plate situated opposite the hinge elements and raised with respect to the general plane of the lower plate, a shearing being provided on each side of the bar, and raising the edge of the lower plate situated opposite the hinge elements such that it has "a curved profile", "the claws 4 of the upper plate, the doors 5 and the raised edge 6 of the lower plate being respectively arranged in such a way that when the initially open staple is closed, the spikes of the claws meet the raised edge 6 with a curved profile in the top portion thereof on the side of the raised edge with a curved profile oriented towards the hinge elements of the staple". This arrangement made it possible to pass the spikes of the claws below the door, locking them at a location situated between the lower face of the conveyor belt and the upper face of the lower portion of the conveyor belt (see FIG. 8 of this patent of the prior art).

Patent EP 0 464 399 also provides (see FIG. 8) a bridge, or door 14 in the lower plate. This bridge is flanked by two holes 13 and 15 provided for the passage of a round wire clip branch. In order to curve the bottom portion of the round wire of the branch of the clip in such a way, when the clips are inserted, as to pass, by means of folding, this bottom portion below the bridge, then into the hole 15 so as to be placed between the lower face of the end of the conveyor belt and the upper face of the lower plate of the staple. An outer matrix of particular shape (see FIG. 7) is, however, indispensable to cause this folding and this routing of the spike of the branch.

The disadvantages presented by the solution of patent FR 2 792 050 consist in the fact that the claws are composed of the same metal as that of the staples, and that therefore it is not possible to choose a metal particularly suited to the clip function, in the fact that the guidance of the spike provided by the raised edge of the lower plate is not perfect, and finally in the fact that the location of the claws is imposed as is the location and orientation of the doors. The disadvantages seriously limit the fields of use of these staples, in particular with regard to heavy conveyor belts which must often be troughed for transporting bulk materials (coal, lignite, ores, phosphates).

The disadvantages presented by the solution of European patent EP 0 464 399 consists in the fact that it uses round wire clips which have only two branches and that it requires the use of an outer matrix of particular shape which must be perfectly positioned to receive the spikes of the clip branches.

The drawback of round wire clips lies in the fact that in order to have an excellent bending strength, it is necessary to increase the diameter thus causing difficulties resulting from the induced over-thickness which cannot be totally accommodated in a recess of the upper plate of the staple, which created problems with the scrapers. In addition, the clips made of round wire include branches, the end portions and spikes of which are made by grinding or milling, have mechanical properties which do not differentiate them from the rest of the clips, i.e. the back of the clips and the body of the branches. For bending the lower portions of the branches, steel wires are generally chosen, the mechanical properties of hardness and bending strength of which are average, with a view to prevent breaking during the bending operations. Such properties are in contradiction with those which are required for the spikes of the branches to go without any difficulty and any deviation through the reinforcing frames of the elastomeric material of the conveyor belts.

It should be noted that, on the clip-staple assembly of patent EP 0 464 399, the staple is provided, in the upper portion thereof, with a recess making it possible to accommodate most of the thickness of the back of the clip. However, a small over-thickness which is liable to be hit by the scrapers remains. If it is desired to increase the diameter of the round wire clip to obtain a better strength therefrom, the problem becomes impossible to solve since it would be necessary to increase the thickness of the upper plate of the staple which can also be hit by the scrapers.

It should be understood that the clips made of round wire cannot be improved because of their basic design.

The means necessary for folding the branches of the clips, in the case of patent EP 0 464 399, involve an outer matrix of a suitable shape for grooving and folding the end portion of the branches, and also a very precise positioning of this matrix, in the most perfect possible alignment with the outlet of the end portion of the branches, outside of the respective holes of the lower plate of the staple.

Now, the conditions of use of conveyor belts, whether in mines, open-air quarries, the transport over long distances of coal, ores, lignite, phosphates, etc., are very severe, and the use of a simple flat anvil, which does not need to be positioned with precision, as is the case with the staples of patent FR 2 792 050, has proved to be very favorable for users. The inventor of the present invention has therefore sought a solution to all these problems, reconciling the contradictory demands imposed by the conditions of installing joining staples, by the conditions of positioning conveyor belts and the necessary strength of the assembly, etc.

SUMMARY OF THE INVENTION

The present invention aims at providing new improved clips and staples which totally eliminate such drawbacks and which further provide new advantages as regards the ease of implementation of the new clip-staple systems as well as the robustness in use of such new clips and staples with, in addition, a versatility for positioning the clip claws and the holes of the staples which makes it possible to create at will particular positioning, making it possible for the staple and the clip which have been mounted to resist constraints exerted in various directions depending on the utilization of the conveyor belt and more particularly in the case of troughing, for the conveying of bulk products.

These goals are reached with a conveyor belt joining staple clip comprising an upper portion forming the back and claws substantially perpendicular to the upper portion forming the back and intended to go through corresponding holes in the upper plate of a joining conveyor belt staple of the type having a U-shaped profile and including an upper plate, a lower plate and one or several knuckles joining the upper plate and the lower plate, characterized in that the upper portion forming the back is composed of a sheet metal plate forming the back and of two or more claws which are substantially perpendicular to the sheet metal plate forming the back and which are connected thereto.

In a first embodiment, the claws are in one piece with the sheet metal plate forming the back, and provide extensions of said plate forming the back, which are perpendicular thereto and connected by a bend of the sheet metal of the plate forming the back.

In another embodiment, the claws of the clip are made of sheet metal portions or wire portions welded on the lower face on the sheet metal plate forming the back of the clip.

In both embodiments, the claws advantageously have a rectangular section, the spike on the claw only being an exception to such a rectangular shape of the section. The orientation of the larger side of the rectangular section is advantageously oriented longitudinally with respect to the clip, but other orientations are possible as this will be explained later as regards preferred embodiments. In alternative solutions, the rectangular section can be replaced by a section having the shape of a trapezium, a half moon or a rectangle having rounded or chamfered corners or even by a circular section in some embodiments.

In certain cases, the larger sides of the rectangular section of the claws are symmetrical with respect to the longitudinal axis of the clip. In the case where some larger sides of the rectangular sections are transversally oriented it can be advantageous for one or several claws to straddle the longitudinal axis of the clip.

The larger sides of the claws section can also have various orientations, with some larger sides being oriented along an angle between these two orientations.

To make the bend separating the upper plate portion from the corresponding claw stronger, a re-entrant reinforcing rib, produced by embossing, is present in the bend of the sheet metal, in the top portion of the claws close to the bend and extending into the bend, and into the portion of the plate forming the back close to the bend, this rib being produced in the longitudinal direction of the claws, approximately in the center of the width of the claws.

To have spikes with a better hardness and bending strength, the spikes on the claws can be hammer-hardened during the manufacture thereof. A less intense hammer-hardening can also be provided on the stem portion of the claws. As the back and the claws can be made in sheet metal according to the invention, an average quality metal can be used, and the stem and spike portions of the claws can also be hammer-hardened during the manufacturing of the clip on the press, by carrying out cutting, bending, embossing and punching operations.

In order to make the provisional assembly of a clip and a staple easier, prior to the final attaching at an end of the belt conveyor, the present invention provides that at least some of the claws have on their outer sides a shallow horizontal groove embossed in the stem of the claw, with a height which is slightly above the thickness of the sheet metal of the upper plate of the joining staple which the clip is intended for, and being located close to the leader of the spike portion which has an oblique plane area with respect to the general plane of the claw, said plane area starting from the extreme spike of the claw and ending with a straight line close to the lower edge of the groove, with the upper edge of the groove being advantageously chamfered and the bottoms of the grooves of two opposite claws having a spacing which corresponds to the spacing of the outermost edges of the holes of the upper plate of the joining staple which the clip is intended for.

It is also possible to provide for grooves on the inner sides of the claws, the groove in each considered claw being horizontal and shallow and embossed in the stem of the claw, with a height which is slightly above the thickness of the metal sheet of the upper plate of the joining staple which the clip is intended for, and being located close to the leader of the spike portion which has an oblique plane area with respect to the general plane of the claw, said plane area starting from the extreme spike of the claw and ending with a straight line close to the lower edge of the groove, with the upper edge of the groove being advantageously chamfered and the bottoms of the grooves of two opposite claws having a spacing which corresponds to the spacing of the innermost edges of the holes of the upper plate of the joining staple which the clip is intended for.

It is thus possible to snap-fit the claws in the edges of the holes of the upper plate on the staple, the clip/staple assembly thus being ready for the engagement of the claws using a hammer or a hydraulic or pneumatic punch. The chamfer provided on the top edge of the groove aims at facilitating the sliding on the edge of the hole, since a straight edge would tend to catch the edge of the hole upon the engagement. Similarly, the oblique area of the spike mentioned here above allows the engagement of the claw into the hole while causing a resilient motion of the clip stem, such motion being reverted upon the snap-fitting of the groove with the edge of the hole of the upper plate of the staple.

With regard to the staple, the invention provides particularly effective means for allowing the folding of the claws below a bridge, without using an outer matrix, only a flat anvil being necessary. According to the invention, there is proposed a conveyor belt joining staple produced from sheet metal plate and comprising an upper staple plate and a lower staple plate of general shape substantially similar to that of the upper plate, the two plates situated at different levels being joined in one piece by one or more knuckles, the upper plate comprising through-holes able to allow the passage of the staple-attaching clip claws in order to traverse an end of a conveyor belt engaged in the space between the two, upper and lower, plates, by the open portion of the staple situated opposite the knuckle or knuckles, the lower plate of the staple comprising bridges, or doors, each constituted by the deformation, towards the space situated between the two plates, of a bar of sheet metal cut from the sheet metal of the lower plate so as to form a recess leaving a space between the bar of said bridge and the upper surface of the lower plate of the staple. The lower plate comprises, on either side of the two shearing lines corresponding to the recess of the bridge, an inlet toboggan and respectively an outlet toboggan which are symmetrical with respect to the longitudinal axis of the bridge, connected in one piece with the rest of the sheet metal constituting the lower plate of the staple, each constituted by a tab which, seen from the side, has a curved profile shape analogous to that of a toboggan, and which is constituted by a portion of the original sheet metal sheared on each side of the tab, perpendicularly to the general direction of the bridge, the width of the tab being slightly greater than that of the claws of the clip provided for the attachment, and corresponding approximately to the width of the space provided below the bridge. The tabs of two opposing toboggans, on either side of the bridge, leave, between the level of the lower face of the bridge and the upper face of the free end of the tab, a sufficient height for the passage of the thickness of a claw of the clip provided.

Each toboggan may additionally comprise, very advantageously, a boss of rectangular general shape seen in plan, constituting a second element of each toboggan, and made, like the tab and the bridge, in the sheet metal of the lower plate of the joining staple, forming a relief on the upper face of the lower plate of the staple, this boss having a round portion at its upper and also rounded portions at its base along the sides of the rectangular shape, on the lines of connection with the upper face of the lower plate of the staple, and in particular a smooth connection with the portion of the tab which is attached to said boss, opposite the free end of the tab, the shearings of the tab extending slightly into the rounded portion of the base of the boss, the larger sides of the rectangle of the general shape of the boss being parallel to the bridge and perpendicular to the tab, the free end of the tab seen in plan being situated approximately below the corresponding edge of the bridge.

The thickness of the portion of the sheet metal constituting the tabs, that of the portion of the sheet metal constituting the bridge and that of the portion of the sheet metal constituting the bosses are reduced by about 50% with respect to that of the rest of the sheet metal of the staple, the lower face of the tabs of the two toboggans thus being flush with the lower surface of the rest of the sheet metal of the lower plate of the staple, of greater thickness. Moreover, this reduction of thickness being obtained during the embossing and punching operation, all the elements are hammer-hardened and thus have excellent hardness and bending strength properties.

Thanks to the design of the clip, the orientations of the claws, the bridge and the toboggans with respect to the longitudinal direction of the staple can be selected as necessary, depending on the constraints provided for the joining.

Several preferred embodiments of the invention, which are not limitative, will now be described while referring to the drawing, the figures of which are summarized herein under.

DETAILED DESCRIPTION OF THE
EXEMPLARY EMBODIMENTS

Several preferred embodiments, which are not limitative, showing clips and staples according to the invention will now be described while referring to the figures of the drawing.

Figure 1:
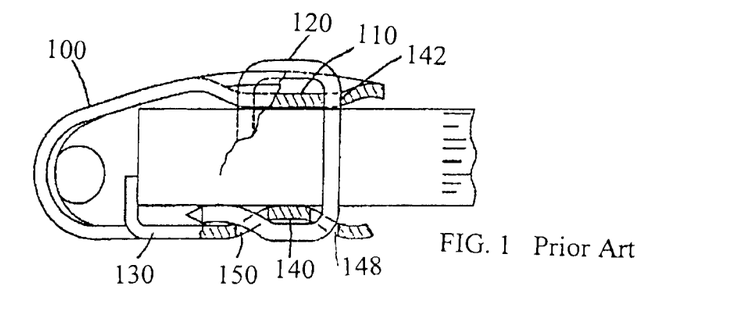
FIG. 1 is a side view, partially in section, of a staple and of a clip made of steel wire of the prior art according to patent EP 0 464 399.

FIG. 1 is a drawing of a clip/staple system of the prior art according to patent EP 0 464 399 mounted on one end of a conveyor belt and shows a clip made of round section metal wire 120, a staple 100 including an upper plate having a recess 110, a lower plate 130 including a bridge 140, holes 142, 148 and 150 being provided for the passage of the branches of the metal wire clip having two generally U-shaped branches.

Figure 2:
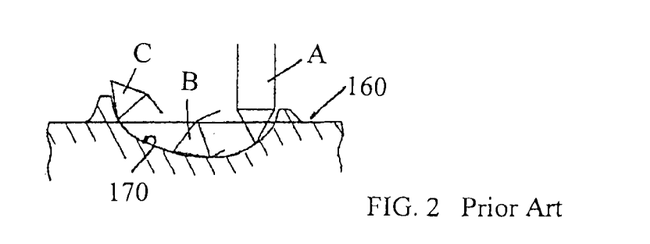
FIG. 2 is a sectional view of the outer matrix necessary for placing the clips, according to patent EP 0 464 399.

FIG. 2 shows in profile the outer matrix 160 which is indispensable for folding the end of a clip branch by virtue of the profile 170, the various phase of the folding being shown at A, B, and C.

Figure 3:
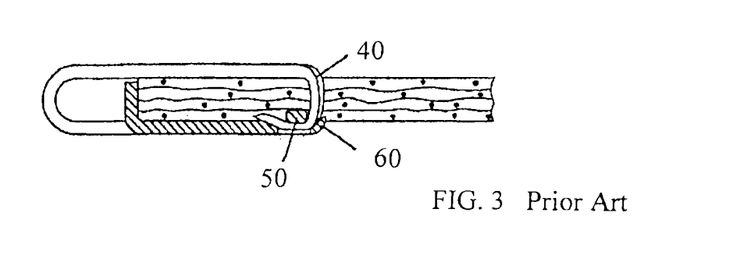
FIG. 3 is a side view, partially in section, of a staple with incorporated claws which is produced in one piece with the upper plate of the staple, according to patent FR 99 045 571 000.

FIG. 3 represents in longitudinal section a staple according to patent FR 99 045 571 000, mounted on an end of a conveyor belt. There are shown a claw 40 extending the upper portion, a bridge 50, and a raised rear edge 60. This raised rear edge 60 serves to curve the claw for the purpose of passing it below the bridge.

Figure 4:
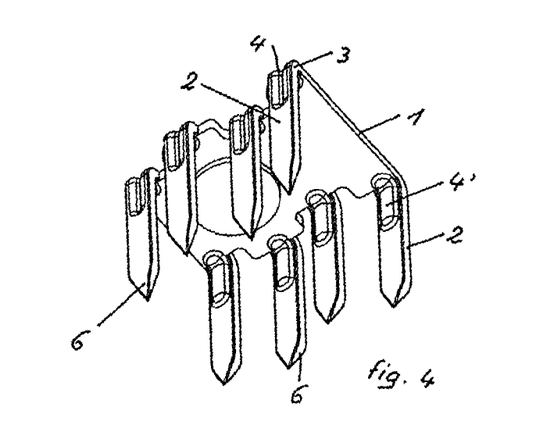
FIG. 4 is a perspective view of one embodiment of the clip according to the invention.

FIG. 4 shows an embodiment of the clip according to the invention, in particular the upper portion forming the back 1, six claws 2, the bends 3 connecting the upper portion forming the back 1 to the claws 2, the re-entrant ribs 4 shown from the outside and their re-entered portions 4', and the spikes 6. As will be easily understood by the person skilled in the art and in the machining of metals, this portion can be obtained by a machining with a press, by cutting, punching and embossing operations. When carrying out these operations, the spikes and if need be the stems 7 of the claws can easily be punched so that they can have a hardness and a bending strength higher than those of the basic metal. It should also be understood that the very design of the clip makes it possible to provide on the same portion forming the back a number of claws greater than 2, which can even reach, if so desired, for example 10 claws. The embodiment shown includes 6 claws positioned in the longitudinal direction. It should be noted that this embodiment advantageously provides shifts as regards the positioning of the claws in the transverse direction. Such shifts make it possible to prevent the creation of longitudinal break lines in the frame of the end of the conveyor belt, traversed by the clips and subjected to tractions and jerks in the longitudinal direction. Such possible break lines would result from drillings aligned in the longitudinal direction which would be caused by non-shifted claws in the transverse direction, the drillings being thus too close to each other in the longitudinal direction.

In the following description of the embodiments of the invention, the same references will be used for similar portions of clips and/or staples. Conventionally, the longitudinal direction of the clips or staples is that of the conveyor belt on which the clip and the staple must be mounted, whatever the dimensions of the clips and the staples. Similarly, the transverse direction will be the direction perpendicular to the longitudinal direction, whatever the dimensions of the clips and the staples. By contrast, the longitudinal direction of the claws and that of the bridge will be that of the larger dimension thereof.

Figure 5:
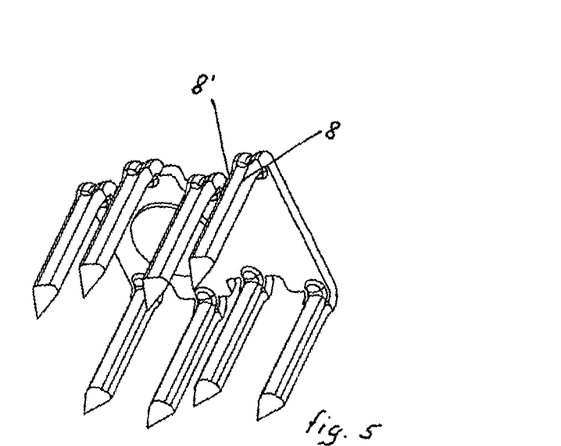
FIG. 5 is a perspective view of an embodiment of the clip according to the invention.

FIG. 5 shows another embodiment of the clip according to the invention, wherein the stems of the staples have a section which is not strictly rectangular since both external angles 8 and 8' of the section are chamfered. In this case too, this form can be obtained during the manufacture thanks to a punching operation.

Figure 6:
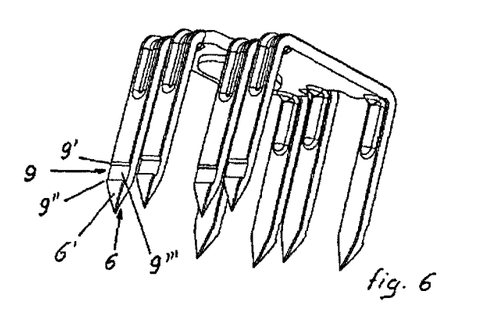
FIG. 6 is a perspective view of a clip similar to that of FIG. 4, but including snapping grooves.

FIG. 6 shows another embodiment of the clip according to the invention which is similar to that of FIG. 4, but wherein grooves 9 provided in the claws can be seen. Such grooves 9 are shallow and they can be obtained in the course of the manufacture of the clip thanks to a punching operation. The grooves 9 include an upper edge 9', a bottom 9" and a lower edge 9'''. The lower edge 9''' is close to an oblique portion 6' of the spike 6 which extends from the extreme spike up to the vicinity of the lower edge 9''' of the groove 9.

Figure 7:
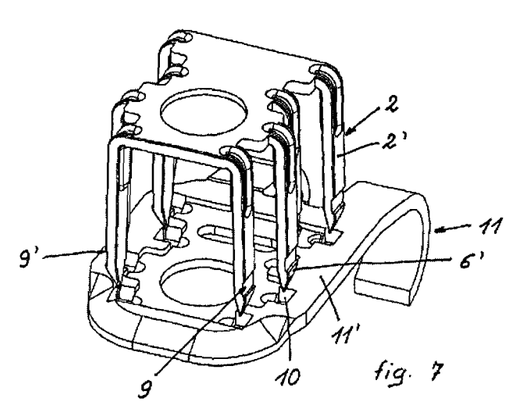
FIG. 7 is a perspective view of a clip according to FIG. 6, ready to be inserted into the corresponding holes of the upper plate of a staple.

FIG. 7 shows the clip according to the invention of FIG. 6, ready to be inserted into the through holes 10 provided in the upper plate 11' of a conveyor belt joining staple 11, such holes having a section adapted to the section of the claws.

Figure 8:
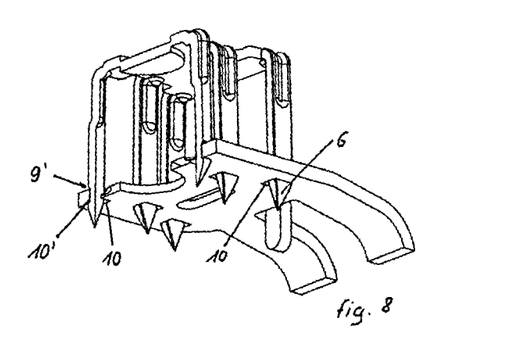
FIG. 8 is a perspective view showing a segment of a clip according to FIG. 6 and a fragment of a staple, with the clip being snap-fitted using the grooves of its claws in the edges of the holes of the upper plate of the staple.

FIG. 8 shows the clip according to the invention of FIG. 7 snap-fitted with the edges 10' of the through holes 10 being engaged in the grooves. Upon the engagement of the grooves in the holes, the oblique portions of the spikes of the claws have temporarily deformed the claws elastically by sliding on the edges of the holes, and when the edges 10' meet the groove the claws get snap-fitted and return to their original shape.

This makes it possible to have clip/staple assemblies ready to be mounted on an end of a conveyor belt.

It should also be noted that in FIGS. 6, 7 and 8 the upper edge 9' of the groove is chamfered. This chamfer aims at preventing the upper edge of the groove from catching the edge of the hole of the upper plate of the staple when the claws are subsequently inserted into the end of the conveyor belt, and thus to allow the smooth insertion of the claws.

Figure 9:
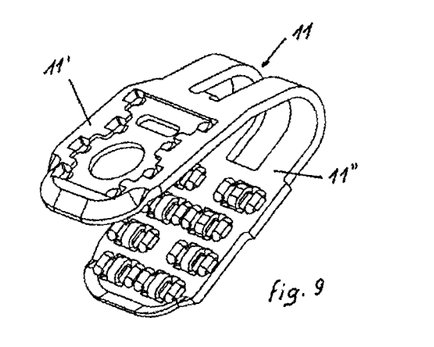
FIG. 9 is a perspective view of an embodiment of a staple according to the invention.

FIG. 9 represents an embodiment of a conveyor belt joining staple 11 according to the entire invention, corresponding to that of FIGS. 7 and 8. The arrangement of the upper portion of the lower plate 11" can be seen.

Figure 10:
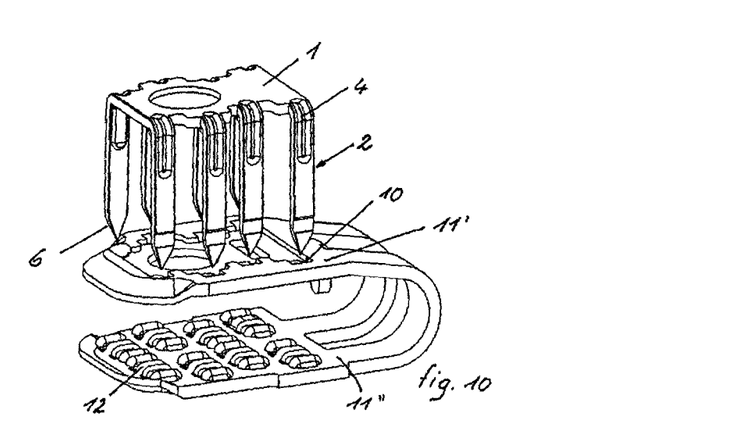
FIG. 10 is a view corresponding to FIG. 7 showing a complete staple of which the lower plate is configured according to the invention, and a clip according to the invention ready to be engaged in the holes of the upper plate of the staple.

FIG. 10 represents the same staple with a clip according to the invention ready to be engaged by its claws into the holes 10 of the upper face 11' of the staple 11.

Figure 11:
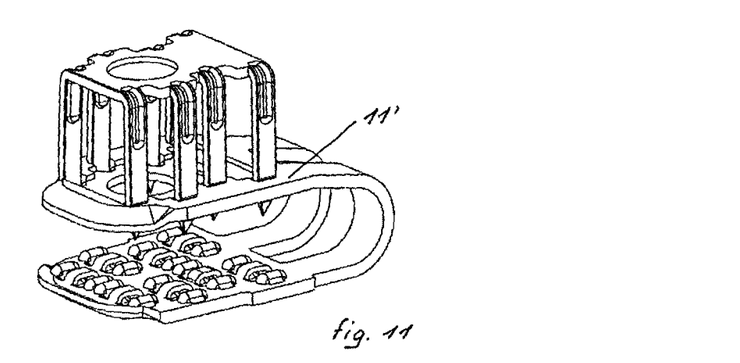
FIG. 11 is a view corresponding to FIG. 8 showing a complete staple of which the lower plate is configured according to the invention, and a clip according to the invention snap-fastened into the edges of the holes of the upper plate of the staple, by means of the grooves of its claws.

FIG. 11 represents the same staple in the upper plate 11' of which a clip according to the invention is engaged.

Figure 12:
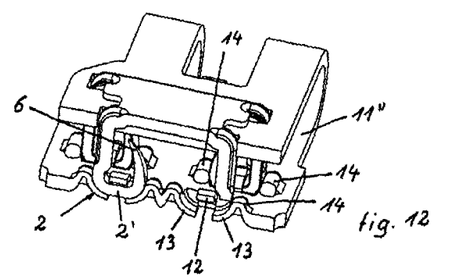
FIG. 12 is a perspective view, in section in the transverse direction of the staple, of a staple/clip assembly, the claws of the clip being in the completely folded state below the bridge, a claw being omitted to show the toboggans, the bridge and the bosses, in section.

FIG. 12 represents in section along a transverse vertical plane the staple according to the invention of FIGS. 9, 10 and 11. The enlargement has the aim of presenting the arrangements provided in the lower plate 11", with a view to allowing the curvature of the spikes 6 of the claws 2 and the stems 2' of the claws 2 of a clip according to the invention, the passage of these spikes 6 below the bridge and the continuation of its curvature bringing the spikes of the claws which again penetrate into the end of the conveyor belt (not shown), engaged between the upper plate and the lower plate. For the requirements of the illustration, only one complete clip claw has been represented, on the left, and one truncated clip claw, on the right, to better show the bridge 12 and the toboggans. The bridge 12, formed in the sheet metal of the lower plate of the staple, can be seen. The bridge 12 is flanked, to the left and to the right in the figure, by two arrangements which can be called "toboggans" by virtue of their shape. The left-hand toboggan being symmetrical with that on the right with respect to the median longitudinal vertical plane of the bridge, only the right-hand toboggan will be described. A tab 13 is cut from the sheet metal of the lower portion of the staple, and it is extended by a boss 14 made in the sheet metal of the lower plate of the staple. It can be seen that the boss is connected without discontinuity or any unevenness at the start of the tab.

It will be understood that this arrangement produced in vertical alignment with the respective hole of the upper plate of the staple makes it possible to receive the spike 6 of the respective claw which meets the curve of the boss 14, slides on the latter and continues its advancement on the tab 13 while matching the shape of the boss 14 and of the tab 13 at the stem portion of the claw which follows the spike. Continuing its advance, the spike of the claw meets the opposed symmetrical bottom portion of the tab 13 and it continues its advance by sliding on this tab and rising to terminate its advance by penetrating into the end of the conveyor belt (not shown). It can be seen in the figure that the thickness of the sheet metal of the bridge, of the tabs and of the bosses is reduced by approximately 50% with respect to that of the original sheet metal, which makes it possible to place the lower face of the tabs flush with the surface of the lower face of the lower plate of the staple.

Figure 13:
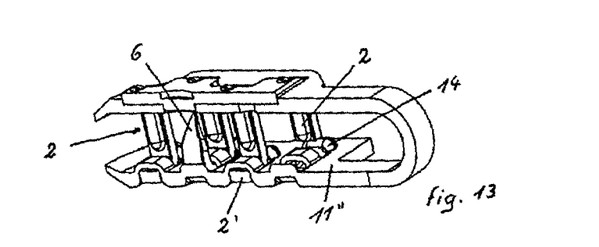
FIG. 13 is a perspective view, in section along a longitudinal vertical plane, of a staple/clip assembly, the claws of the clip being in the completely folded state, a claw having been omitted to show the toboggans, the bridge and the bosses.

FIG. 13 is a perspective view, in section, along a longitudinal vertical plane, of the staple according to the invention of FIGS. 9, 10 and 11. There can be seen the same elements bearing the same references as those represented in FIG. 12, but seen from another angle.

Figure 14:
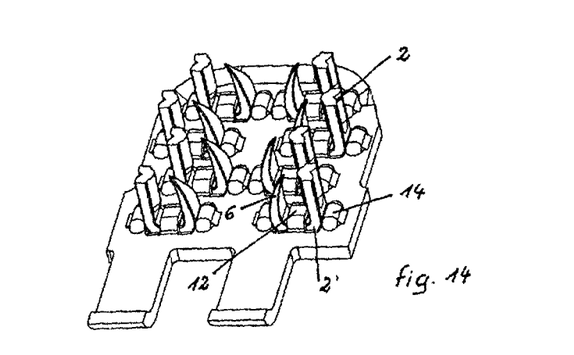
FIG. 14 is a perspective view representing a staple in section along a horizontal plane, showing the upper face of the lower plate of the staple and also the claws of the clip, a claw having been omitted to show the toboggans, the bosses and the bridge.

FIG. 14 is a fragmentary perspective view of the staple according to the invention of FIGS. 9, 10, 11, 12 and 13 showing the upper face of the lower plate of a staple in section at the level of the knuckles. The same elements bearing the same references as in FIGS. 9, 10, 11, 12 and 13 appear at another angle.

Figure 15:
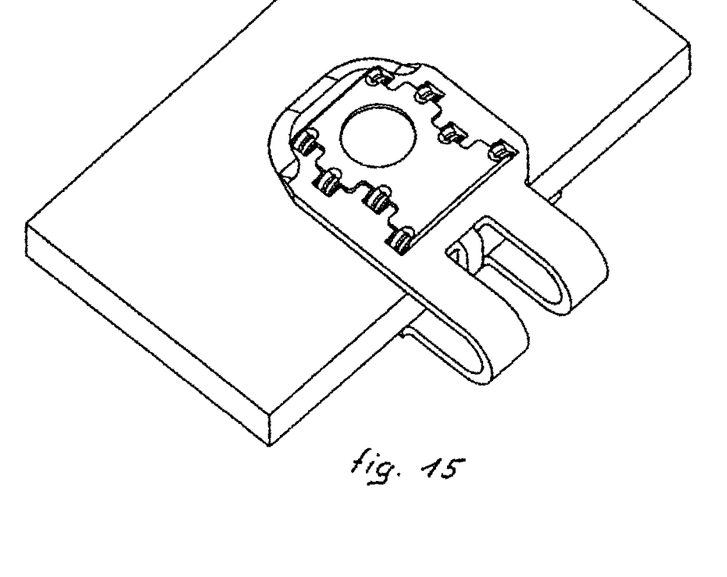
FIG. 15 is a perspective view showing a staple mounted on one end of a conveyor belt, the upper portion forming the back of the clip being visible buried in a recess of the upper plate of the staple, and a portion of the bends of the claws being also visible.

FIG. 15 shows the staple of FIGS. 9, 10, 11, 12, 13 and 14 mounted on the end of a conveyor belt. It should be noted that the clip is almost totally engaged in a recess of the upper face of the upper plate of the staple. Such a clip which is correctly attached by the multiple staples thereof is protected against the stripping caused by the scrapers during operation of the conveyor belt. Something important should be noted here. Thanks to the design of the clip according to the invention, in all the embodiments thereof, the upper plate can be relatively thin which makes its accommodation in the recess 15 of the upper plate of the staple easier, whereas the claws obtained by cutting and bending the sheet metal of the upper plate can have a large section using a rectangular shape, or another shape, as mentioned above, which has one of the dimensions of the cross-section of the claw which is much larger than that of the other dimension which corresponds to the thickness of the upper plate. In the case of claws welded on the upper portion forming the back, the selection of the cross-section of the claw is obviously wide since this series of clips according to the invention also has the advantages of the multiple-claw clip according to the invention, the upper portion forming the back of which can have a relatively small thickness and be easily buried in the upper plate of the staples.

Figure 16:
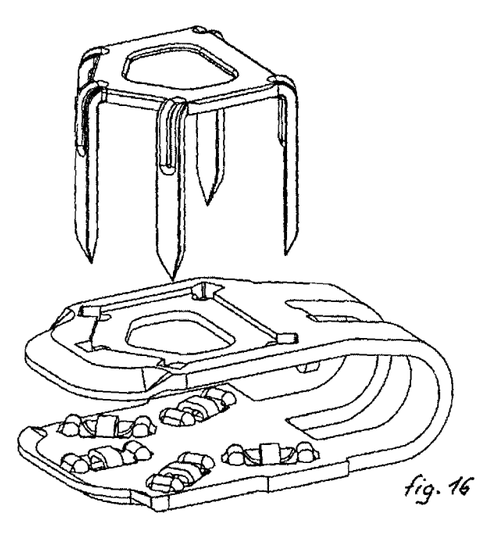
FIG. 16 shows another embodiment of the clip and a corresponding staple according to the invention.

FIG. 16 shows another embodiment, a so-called star embodiment, of the clip and the staple according to the invention. It should be noted that the orientations of the toboggans with respect to the longitudinal direction of the clip and of the staple are varied. Such plurality of orientations makes it possible for the positioned staple to behave properly in the case where the conveyor belt is subjected to forces and jerks oriented in various directions, particularly in the case of the troughing of the conveyor belt intended for the treatment of bulk materials.

Figure 17:
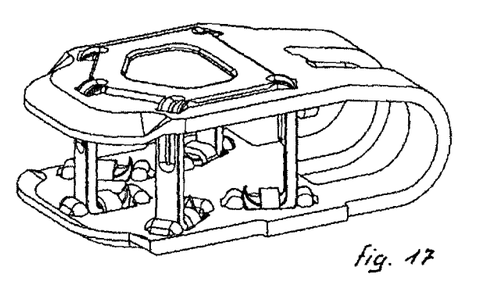
FIG. 17 shows a clip according to FIG. 16 mounted on a staple according to the invention having a corresponding shape.

FIG. 17 shows the same staple and the same clip as FIG. 16 with the clip being in its final position in the staple.

Figure 18:
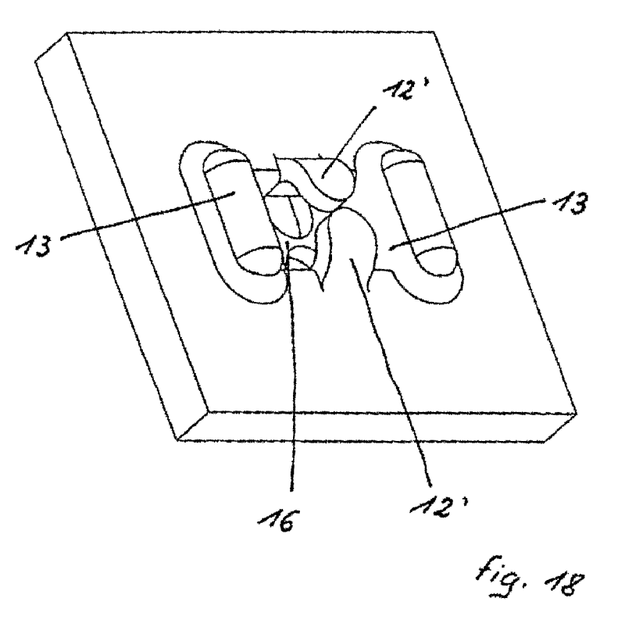
FIG. 18 is a perspective view representing a variant embodiment in which the bridge is divided into two half-bridges, and the two toboggans are joined by a strip of metal converting them into a single uninterrupted toboggan.

FIG. 18 represents a particular embodiment of the toboggans and of the bridge. It can be seen that the bridge is divided by a gap into two half-bridges. This particular configuration of the bridge makes it possible to keep between the left-hand and right-hand tabs 13, 13 the metal of the sheet corresponding to the gap between the two half-bridges 12', 12" and therefore to produce, instead of the two separate left-hand and right-hand toboggans, an uninterrupted double toboggan by virtue of the track 16 which exists between the two tabs.

Figure 19:
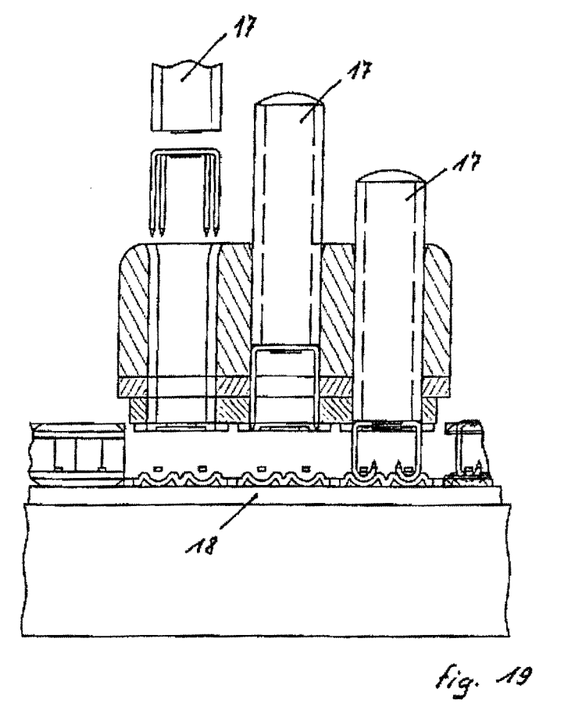
FIG. 19 is a sectional view showing 3 phases of the placing of a staple by means of a clip according to the invention.

FIG. 19 represents the three phases of inserting a clip into the staple and into the conveyor belt. A punch and a flat anvil can be seen. The punch can be replaced by a hammer. Of course, the figure represents the three phases of one and the same clip insertion.

The invention thus reaches all the initially aimed at goals, i.e. the easy manufacturing using tools well known to the persons skilled in the art, without any reworking, of a strong multiple-claw clip including a relatively thin back which can be easily accommodated without overly protruding at the upper plate of the staple. The claws can show hardness and bending strength properties which are different from those of the portion forming the back of the clip, without any reworking after the manufacturing of the clip through working on the press and using an average quality metal thanks to a different hammer-hardening which can be obtained without reworking, and carried out using the tool for manufacturing the clip. The same statement applies to the bridge and the toboggans of the staple.

The versatility of the permissible configurations, without leaving the scope of the invention, is particularly remarkable.

What is claimed is:

1. A conveyor belt joining staple produced from sheet metal plate and comprising an upper staple plate and a lower staple plate of general shape substantially similar to that of the upper staple plate, the two upper and lower staple plates situated at different levels being joined in one piece by one or more knuckles, the upper staple plate comprising throughholes able to allow the passage of staple-attaching clip claws in order to traverse an end of a conveyor belt engaged in a space between the two, upper and lower, staple plates, by an open portion of the staple situated opposite the knuckle or knuckles, the lower staple plate of the staple comprising bridges, or doors, each constituted by the deformation, towards the space situated between the two upper and lower staple plates, of a bar of sheet metal cut from the sheet metal of the lower staple plate so as to form a recess leaving a space between the bar of said bridge and an upper surface of the lower staple plate of the staple, wherein the lower staple plate comprises, on either side of two shearing lines corresponding to the recess of the bridge, an inlet toboggan and respectively an outlet toboggan which are symmetrical with respect to a longitudinal axis of the bridge, connected in one piece with the rest of the sheet metal constituting the lower staple plate of the staple, each constituted by a tab which, seen from a side, has a curved profile shape analogous to that of a toboggan, and which is constituted by a portion of the original sheet metal sheared on each side of the tab, perpendicularly to the general direction of the bridge, a width of the tab being slightly greater than that of the claws of the clip provided for the attachment, and corresponding approximately to a width of the space provided below the bridge, such opposed tabs, on either side of the bridge, leaving, between the level of a lower face of the bridge and an upper face of the free end of the tabs, a sufficient height for the passage of the thickness of a claw of the clip provided, wherein each toboggan additionally comprises a boss of rectangular general shape seen in plan, constituting a second element of each toboggan, and made, like the tab and the bridge, in the sheet metal of the lower staple plate of the joining staple, forming a relief on the upper face of the lower staple plate of the staple, this boss having a round portion at its upper and also rounded portions at its base along the sides of the rectangular shape, on the lines of connection with the upper face of the lower staple plate of the staple, and in particular a smooth connection with the portion of the tab which is attached to said boss, opposite the free end of the tab, the shearings of the tab extending slightly into the rounded portion of the base of the boss, the larger sides of the rectangle of the general shape of the boss being parallel to the bridge and perpendicular to the tab, the free end of the tab seen in plan being situated approximately below the corresponding edge of the bridge, and wherein each inlet toboggan-boss is situated in vertical alignment with a corresponding hole of the upper plate for the passage of staple-attaching clip claws.

2. The conveyor belt joining staple according to claim 1, wherein a thickness of the portion of the sheet metal constituting the tabs, that of the portion of the sheet metal constituting the bridge and that of the portion of the sheet metal constituting the bosses are reduced by about 50% with respect to that of the rest of the sheet metal of the staple, a lower face of the tabs of the two tobogggans thus being flush with a lower surface of the rest of the sheet metal of the lower staple plate of the staple, of greater thickness.

3. The conveyor belt joining staple according to one of claims 1, wherein a gap made at a center of each of the bridges, transversely to the largest dimension of the bridge, divides the bridge thus forming two half-bridges and that the tabs of the two corresponding, inlet and outlet, tobogggans are joined in one piece by a strip of sheet metal whose width and shape correspond to the width and shape of the gap separating the two half-bridges.

\* \* \* \* \*